Patented Apr. 29, 1924.

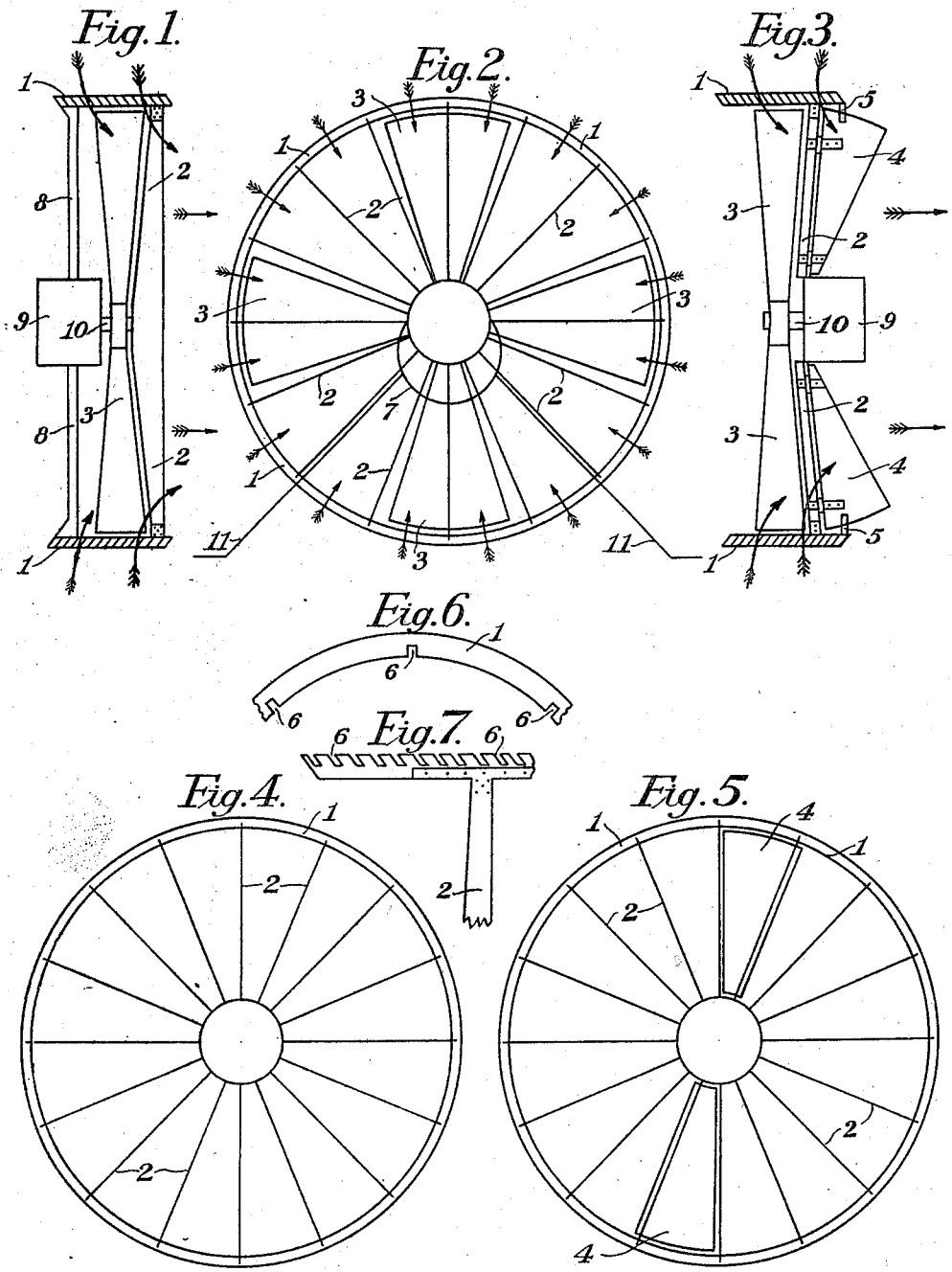

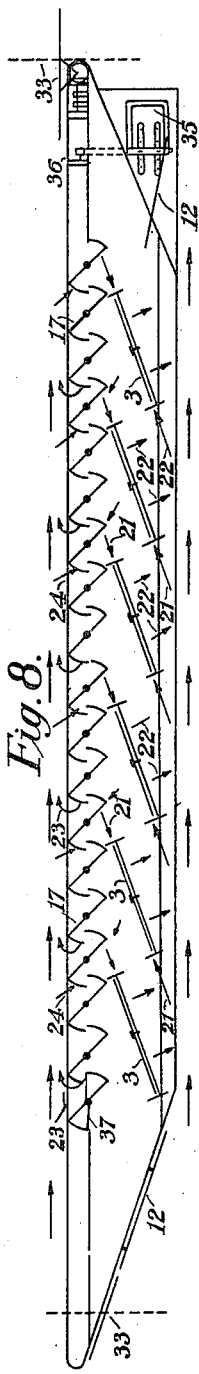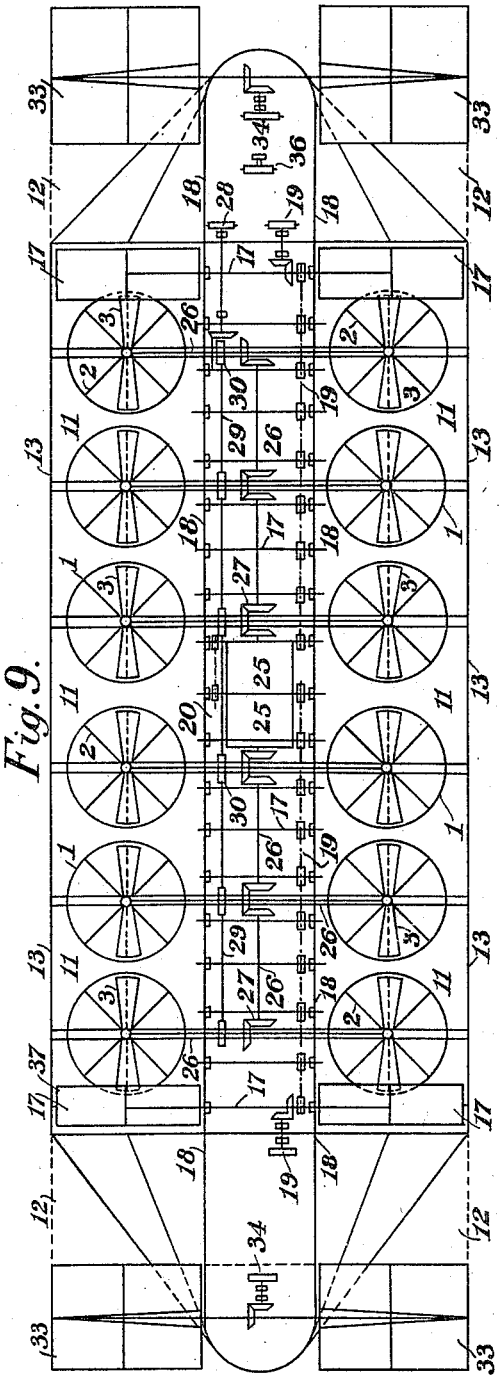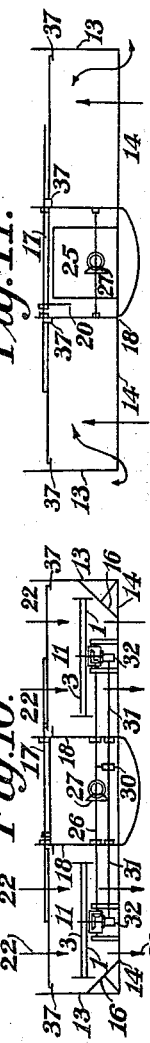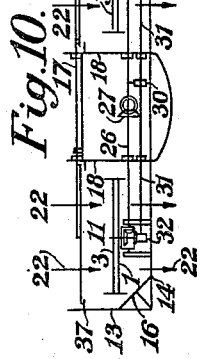

1,491,982

UNITED STATES PATENT OFFICE.

GEORGE ALBERT CHADDOCK, OF LIVERPOOL, ENGLAND.

DEVICE FOR UTILIZING THE REACTIVE FORCE SET UP BY ROTATING A SCREW PROPELLER OR SCREW FAN OR THE LIKE IN A FLUID.

Application filed July 3, 1922. Serial No. 572,753.

*To all whom it may concern:*

Be it known that I, GEORGE ALBERT CHADDOCK, a subject of the King of Great Britain, and a resident of Liverpool, England, have invented certain new and useful Improvements in a Device for Utilizing the Reactive Force Set Up by Rotating a Screw Propeller or Screw Fan or the like in a Fluid, of which the following is a specification.

The invention has for its object the utilization of reactive forces set up by the rotational action of displacing instruments such as power driven propellers, fans, and the like giving rise to a radial inflow into the disc area of the displacing instrument in the course of its rotation, constituting a force hitherto running waste which will be utilized under this invention by fitting a series of deflector rings around the periphery of the displacing instrument for deflecting the radial inflow rearwardly and thus freeing the displacing instrument from the incubus of an overload of fluid which tends to congestion and increased swirl effect. The deflector rings are sustained rigidly in position by carrier deflector supports adapted to receive the rings and maintain them in their angular position as suitably shaped and spaced apart from each other to avoid congestion of the fluid in course of deflection. These carrier deflectors are attached to and supported by radial arms the number of which arms may be varied to suit any particular requirement but intermediate carrier deflectors without supporting radial arms may be fitted to act also as stringers or binders for the deflector rings for suitably staying and strengthening same as required. These carrier deflectors and binding deflectors may be adjusted to a suitable angle where required to cause a portion of the radial inflow to be deflected in a direction opposite to that in which the displacing instrument rotates to help counteract the rotational swirl or torque effect. As the radial inflow constitutes the bulk of the feed for the propeller, under headway speed in water, and as this feed will be drawn through the deflector rings faster than the ship progresses, particularly with a displacer of fine pitch angle, the deflectors therefore cannot offer resistance to ahead speed but should on the other hand exert a powerful brake action in arresting headway speed when the propeller is reversed.

The propeller now commonly applied, in both air and water, was originally adopted as an emergency device to overcome the difficulty of ocean propulsion where the application of side paddles became and still remains, from an efficiency standpoint, a sheer impossibility. Its operation should be considered as equivalent to that of an unenclosed pump with a triple feed comprised in a radial inflow, a frontal feed and rearward reaction flow all varying in proportion to the pump's rotational velocity, moreover as it is an unenclosed proposition it is consequently also subjected to severe reactive and varying pressures affecting its discharge, it follows nothing but the state of chaos and loss now ruling can be expected under such adverse conditions.

As the question of efficient propulsion really narrows itself down to that of obtaining headway speed by pumping the fluid rearwards it follows as a natural sequence that the feed should be derived as much as possible from the radial inflow in order to give the pump blades a grip of the fluid as any acceleration in advance of the instrument must necessarily reduce the value of the thrust reaction and as this thrust reaction will be exactly proportionate to the volume that can be forced rearwards, under direct pressure, it should be delivered as nearly as possible in a straight line and under a maximum of pressure such as can only be completely effected by controlling the frontal inflow. These are cardinal conditions necessary to efficiency. In the strongest possible contrast the under water rotational displacer is very severely handicapped by compound acceleration of the water which follows the rotational action of the displacer as well as that of its angular action in projecting water partly sideways and partly rearwards and in this connection the following wake in marine practice, set up by the skin friction and closing in of the water at the stern, under headway speed, causes increased resistance to the projection of water rearwards thereby causing the fluid which is driven at an angle against this resistance to cushion off it at a still more acute angle thus tending to bring about an increase in swirl effect and corresponding decrease in thrust reaction proportionate to rotational velocity. It follows the following wake resistance and reaction to the rearward drive forms at present a severe handicap to an under water angular displacer by causing an increase in swirl effect and considering that approximately 50% of the power now transmitted to the propeller is lost in rotational suction this loss is further seriously increased in the effort to deflect rearwards, at an angle, fluid to which circular acceleration has been imparted by the blade in advance which further causes induction of the frontal inflow at an acute angle under which the following blade operates at the greatest disadvantage by rotating in a fluid that has already been accelerated by the blade in advance, in either water or air, whereas by utilizing the radial inflow the feed is stabilized and a counter check over the rotary motion may also be effected by the radial inflow. As a fluid will always move on the line of least resistance and as the "law of gyration" or rotation of a fluid provides that a maximum volume can be moved at a minimum of expenditure of power rotationally, on the line of least resistance, it is therefore impossible to attain efficient thrust reaction as long as this detrimental action is facilitated as now under present conditions of rotational swirl as evidenced in the rotary wake stream. Another material point of importance is the fact that hitherto no attempt has been made to harness up the reactionary force arising from displacement pressure. As the pressure in water increases approximately ⅜ths of a pound per square inch of surface for every foot of immersion we thus have a very powerful auxiliary aid to thrust value that can be harnessed up by these deflector rings, the value of which will be proportionate to the depth at which the propeller operates in deep water ships and in submarine craft, when submerged. The deflectors will not only utilize the inrush of fluid behind the blade but they will also, by so doing, materially assist in stabilizing the pressure in the disc area and thus minimize vibration and ease the severe strains now borne by the propeller under present wide inequalities of radial pressure flow in the disc area as between the pressure at or near the surface and that at the keel which tends to propeller and shaft breakages. As the following wake exercises a powerful retardation action over the frontal inflow into a disc area it will thereby materially increase the radial inflow and add to the auxiliary thrust derived from the deflectors therefore the following wake or part of the energy absorbed thereby is also available to be utilized by this invention which should cause the rearwardly driven stream to be materially increased in volume and force of delivery by these deflectors which should result in a much higher rotational velocity being obtained than is at all possible under present conditions in which the instrument merely acts as a rotational angular displacer in the course of which the bulk of the power is now absorbed in setting up a rotational swirl or churning action whereas by these improvements the deflectors act as an auxiliary aid in such manner as to help the propeller to set up the equivalent of a really efficient screw action in a fluid by which a very much greater volume can be projected more directly rearwards and at a greater pressure, with its consequent reactive auxiliary thrust, than is otherwise possible. The equivalent gains arising from pressure displacement and following wake stream control over frontal inflow in water may be obtained in a proportionate degree in air under these improvements by providing means, in construction, to enable the reactive forces to be utilized to advantage in air. To enable the reactive forces to be efficiently harnessed up the propeller should be so shielded as to prevent any frontal inflow, on the line of axial advance, when in horizontal flight. To effect this a series of propellers may be fitted one behind the other in any form of hull that may be designed to be open to the passage of air from above or below and in which the propellers are protected from the effect of passing air, particularly from the front or bow on the line of axial advance, but in order to prevent crashing it is necessary also to utilize the reactive forces set up in forced descent, therefore for the effective utilization of these reactive forces a suitable design is set out which, while facilitating the full benefits of the radial inflow in horizontal flight, will also provide against crashing in forced descent which is an important feature under this design and to enable this to be carried out, the design described herein provides for the maximum lift by a series of propellers and planes under a relative minimum constructive weight proportionate to gross lift, with a wide expanse of air control resistance surface for offering resistance to forced descent under engine failure in a large craft. To enable this to be effected the central hull may, for marine purposes, be made watertight and adapted to carry the engine and all accessories also to accommodate passengers and crew. The propellers are mounted on suitable supports extending across the vessel and in such form as to enable a series of propellers to be rotated on each side of a craft and so shielded from frontal and passing air by suitable bow and side extensions as to enable the air flowing down through the controlled partition spaces to be so regulated and controlled as to restrict as much as possible the inflow on the shaft line in order to further enhance the radial inflow. For this purpose the partitioned spaces above the propellers will be so adjusted as to automatically regulate the air supply at the same time being subjected to such mechanical control as to further regulate and control the air feed by suitable hand controls fitted at both ends of the vessel and centrally in the engine room in such manner that all the controls may be operated simultaneously or in groups from either end or from the engine room to ensure instant closure of all air passages in case of forced descent, or for trimming purposes the air control partitions being also adjusted to close automatically directly the propellers stop when the partitions will form a pressure resisting deck to prevent crashing.

This method of air control will provide means for ensuring even a greater degree of control over frontal inflow than is obtained by the effect of the wake stream in water and thus enable the reactive forces derived from the radial inflow to be utilized to best advantage in horizontal flight. Tests of the effect of this control indicate that a retardation effect exercised over the inflow on the shaft line, at a suitable distance from the displacer, will increase the thrust effect of deflector rings by approximately 50% making a gross increase of 100% over and above that of propeller thrust. It is computed there will never be less than 10% retardation in marine practice which should increase the radial auxiliary thrust by more than the increase recorded by air tests. The controls for air will enable the retardation of frontal inflow to be regulated to the best advantage and to further enable efficient control to be exercised over the reactive forces the propellers being fitted one behind the other will exert a further controlling effect over the frontal inflow and assist in easing congestion of rearwardly driven column. The deflectors are therefore designed to provide for the utilization of reactive forces from two material standpoints. First—volumetric efficiency where such is the prime consideration and second—from the thrust standpoint where the actual thrust value is of main importance. By the means described the great bulk of the losses arising from the power now expended in rotational drag suction at the back of the blade are prevented and the efficiency of the instrument materially increased.

I claim:—

1. A series of fixed ring deflectors peripherally surrounding a power driven propeller or fan said deflectors inclined at an angle to deflect rearwardly the fluid entering from the outer circumference of the rings.

2. In an aircraft protected air spaces for shielding the power driven propellers or fans from frontal or side inflow said spaces being subdivided above the displacing instruments by adjustable air controlled partitions suitably spaced and arranged to open automatically when starting the engine actuating the propellers and to close automatically when the engine stops to control the air movements and thus form an air or partial air reservoir for controlling and utilizing reactive forces as an aid to thrust in flight and to prevent crashing by retarding descent under engine failure.

3. A series of fixed ring deflectors peripherally surrounding a power driven propeller or fan said deflectors inclined at an angle to deflect rearwardly the fluid entering from the outer circumference of the rings, radial arms forming supports for sustaining and staying carrier deflectors with their attached ring deflectors.

4. A series of fixed ring deflectors peripherally surrounding a power driven propeller or fan said deflectors inclined at an angle to deflect rearwardly the fluid entering from the outer circumference of the rings, radial arms forming supports for sustaining and staying carrier deflectors with their attached ring deflectors, said carrier deflector supports being adapted to receive and stay the ring deflectors and to help counteract rotary motion of the fluid.

5. A series of fixed ring deflectors peripherally surrounding a power driven propeller or fan said deflectors inclined at an angle to deflect rearwardly the fluid entering from the outer circumference of the rings, radial arms forming supports for sustaining and staying carrier deflectors with their attached ring deflectors, said carrier deflector supports being adapted to receive and stay the ring deflectors and to help counteract rotary motion of the fluid, hinged extensions adapted for closure of the air spaces in the rear of the disc area.

6. In an aircraft protected air spaces for shielding the power driven propellers or fans from frontal or side inflow said spaces being subdivided above the displacing instruments by adjustable air controlled partitions suitably spaced and arranged to open automatically when starting the engine actuating the propellers and to close automatically when the engine stops to control the air movements and thus form an air or partial air reservoir for controlling and utilizing reactive forces as an aid to thrust in flight and to prevent crashing by retarding descent under engine failure, means for so adjusting said partitions as to further aid in regulating the air supply to any required degree or to effect a closure collectively or in groups from the engine room or from either or both ends of the craft for trimming purposes to effect a safe landing on an even keel.

7. In an aircraft protected air spaces for shielding the power driven propellers or fans from frontal or side inflow said spaces being subdivided above the displacing instruments by adjustable air controlled partitions suitably spaced and arranged to open automatically when starting the engine actuating the propellers and to close automatically when the engine stops to control the air movements and thus form an air or partial air reservoir for controlling and utilizing reactive forces as an aid to thrust in flight and to prevent crashing by retarding descent under engine failure, means for so adjusting said partitions as to further aid in regulating the air supply to any required degree or to effect a closure collectively or in groups from the engine room or from either or both ends of the craft for trimming purposes to effect a safe landing on an even keel, shafting and gearing for ensuring uniform power and velocity of all displacing instruments.

8. In an aircraft protected air spaces for shielding the power driven propellers or fans from frontal or side inflow said spaces being subdivided above the displacing instruments by adjustable air controlled partitions suitably spaced and arranged to open automatically when starting the engine actuating the propellers and to close automatically when the engine stops to control the air movements and thus form an air or partial air reservoir for controlling and utilizing reactive forces as an aid to thrust in flight and to prevent crashing by retarding descent under engine failure, means for so adjusting said partitions as to further aid in regulating the air supply to any required degree or to effect a closure collectively or in groups from the engine room or from either or both ends of the craft for trimming purposes to effect a safe landing on an even keel, shafting and gearing for ensuring uniform power and velocity of all displacing instruments, shafting and gearing for ensuring uniform simultaneous angular adjustment of all displacing instruments.

9. In an aircraft protected air spaces for shielding the power driven propellers or fans from frontal or side inflow said spaces being subdivided above the displacing instruments by adjustable air controlled partitions suitably spaced and arranged to open automatically when starting the engine actuating the propellers and to close automatically when the engine stops to control the air movements and thus form an air or partial air reservoir for controlling and utilizing reactive forces as an aid to thrust in flight and to prevent crashing by retarding descent under engine failure, means for so adjusting said partitions as to further aid in regulating the air supply to any required degree or to effect a closure collectively or in groups from the engine room or from either or both ends of the craft for trimming purposes to effect a safe landing on an even keel, shafting and gearing for ensuring uniform power and velocity of all displacing instruments, shafting and gearing for ensuring uniform simultaneous angular adjustment of all displacing instruments stabilizing end controls at each end with their operating control connections.

GEORGE ALBERT CHADDOCK.

Witnesses:
W. F. HOLLWAY,
J. COCKBURN.